April 30, 1940.    E. L. SHAW    2,198,922
COUPLING
Filed Nov. 16, 1938    2 Sheets-Sheet 1
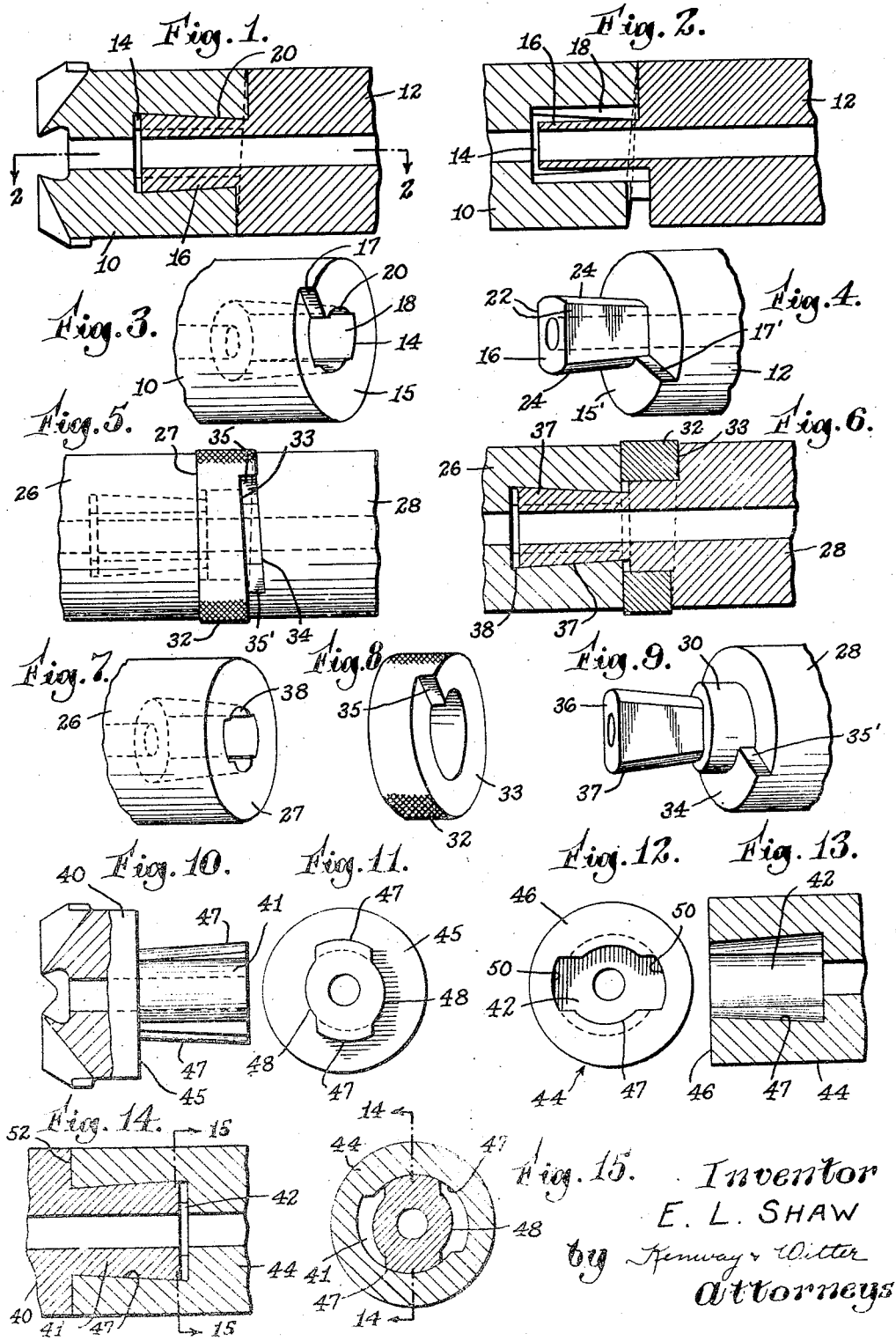
Inventor
E. L. SHAW
by Kenway & Witter
Attorneys April 30, 1940. E. L. SHAW 2,198,922
COUPLING
Filed Nov. 16, 1938 2 Sheets-Sheet 2
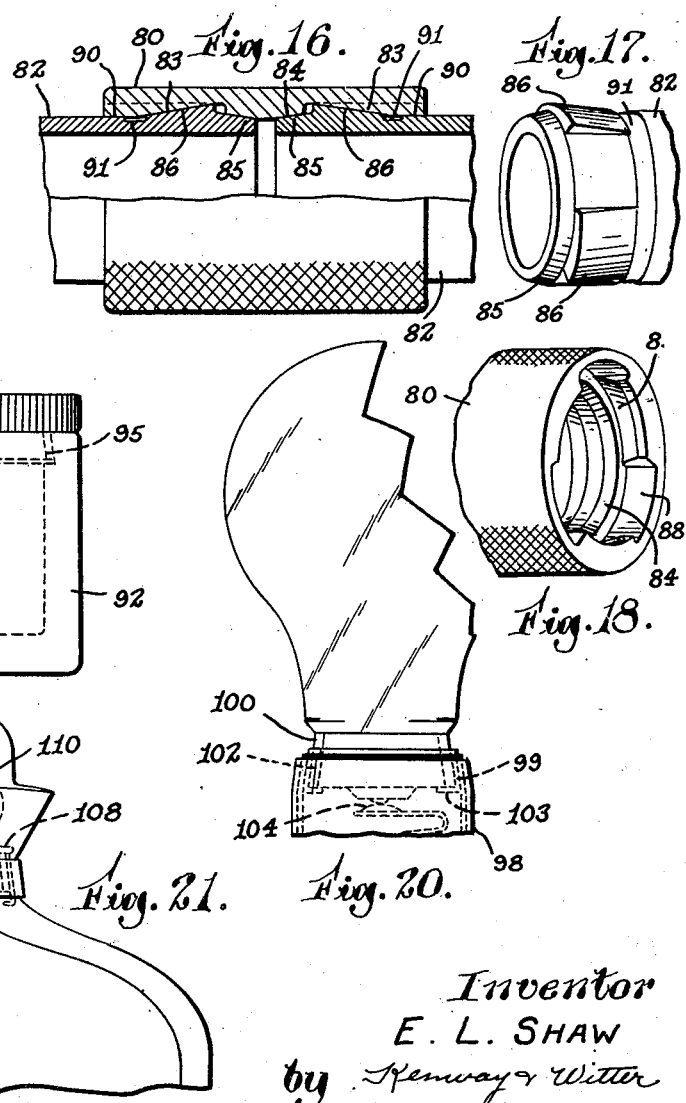

Patented Apr. 30, 1940

2,198,922

UNITED STATES PATENT OFFICE 2,198,922

COUPLING

Edward L. Shaw, Brookline, Mass., assignor to Shawlock, Inc., Boston, Mass., a corporation of Massachusetts Application November 16, 1938, Serial No. 240,689

15 Claims. (Cl. 285—175)

This invention relates to couplings and more particularly to a novel coupling adaptable to a wide application of many and various uses. The most common coupling heretofore known and in use embodies the screw thread or some adaptation thereof and the primary object of my invention is the production of a novel and relatively simple coupling which can be used in lieu of the screw thread and which is quicker, stronger, and otherwise superior thereto.

My novel coupling is adaptable to such uses as the joining together of sections of rods, pipes, hose, and the like, providing stoppers for containers of various kinds, providing a coupling joint for electric light bulbs within their sockets, and numerous other uses, as in munitions, tool chucks, etc., and, in addition to being relatively quick and easy to couple and uncouple, the joint thus provided has other and numerous advantages, including a fluid-tight connection for pipes, stoppers, and the like and a joint of great strength and rigidity.

These and other features of the invention will be best understood and appreciated from the following description of certain embodiments thereof selected for purposes of illustration and shown in the accompanying drawings wherein, Fig. 1 is a longitudinal sectional view through a rock drill and its stem joined together by my novel coupling, Fig. 2 is a like view taken on line 2—2 of Fig. 1, Figs. 3 and 4 are fragmentary perspective views of the drill and stem arranged in position to illustrate the elements comprising the joint, Fig. 5 is a side elevation of a similar joint embodying a modified form of the invention, Fig. 6 is a longitudinal sectional view therethrough, Figs. 7, 8 and 9 are perspective views of the members comprising this joint, Figs. 10 and 11 are side and end elevations respectively of a tool bit employing a further modified form of my novel joint, Figs. 12 and 13 are end and sectional views respectively of a stem constructed to cooperate with the bit shown in Figs. 10 and 11, Figs. 14 and 15 are longitudinal and cross-sectional views respectively of such bit and stem joined together, these views being taken respectively on lines 14—14 of Fig. 15 and lines 15—15 of Fig. 14, Fig. 16 shows in side elevation and in section a novel pipe joint embodying my invention, Figs. 17 and 18 are fragmentary views in perspective of the elements forming this novel joint.

Fig. 19 is a side elevation of a jar and cover employing my invention,

Fig. 20 illustrates the invention applied to an electric light bulb and socket,

Fig. 21 illustrates the invention employed in a hot water stopper.

Referring first to Figs. 1-4 of the drawings, 10 indicates a rock drill bit and 12 the stem for carrying the bit. The bit has a socket 14 formed within its rear end and open to its face 15 to receive a portion 16 projecting forwardly from the forward end of the stem. The socket is bored to conical configuration and is cut away to provide diametrically opposite recesses 18 whereby leaving two diametrically opposite transversely curved inner surfaces 20 converging in a direction toward the face 15. The portion 16 is formed to conical configuration complemental to that of the socket and is cut away at 22 to a configuration which will permit the portion 16 to enter the socket when the wider part thereof is in registration with the recesses 18. The peripheral surfaces 24 of this portion are curved transversely and diverge in a direction toward the free end thereof.

The faces 15 and 15' of the two members or parts are formed as cooperating cam surfaces ending in shoulders 17 and 17'. These surfaces and shoulders are so constructed relative to the socket 14 and projection 16 that when the shoulders are substantially in alignment the projection may be inserted into the socket. When the projection has been inserted to the bottom of the socket, the two parts may be relatively rotated approximately 90° whereupon the oppositely disposed curved surfaces 24 are directly opposed to the corresponding surfaces 20. The cam faces 15 are so constructed that this relative rotation causes a relative separating movement between the two parts and draws the surfaces 20 and 24 into tight contact with each other whereby providing a secure joint.

In Figs. 5-9 I have illustrated a modified form of the above described joint. Reference character 26 indicates a socket member substantially like the socket member 10 except that its front face 27 is plane. A cooperating member 28 is like the stem 12 except that it is provided with an intermediate shank portion 30 for carrying a cam ring 32. The ring is provided with a cam face 33 for cooperating with the cam face 34 on the member 28. When assembling these parts, the ring is positioned on the shank 30 with its shoulder 35 in contact with the shoulder 35'. The portion 36 is then inserted to the bottom of the socket and rotated 90° which brings the transversely curved surfaces 37 and 38 of the two parts into opposing relation. The ring is then rotated in a direction separating its shoulder 35 from the shoulder 35' and to a position wherein the cam faces have drawn the curved surfaces into tight engagement.

In Figs. 10–15 is illustrated a further modified form of the invention wherein the tool bit 40 carries a projection 41 adapted to engage within a socket 42 formed in the stem 44, both end faces 45 and 46 being plane. The inner wall of the socket and the periphery of the projection are not only tapered longitudinally in the directions illustrated but each is also formed with two 180° eccentrics 47. The projection is cut away at oppositely disposed portions 48 and the socket is likewise cut away at oppositely disposed portions to form recesses 50, whereby the projection may be inserted into the socket. When the projection has been fully inserted into the socket, the two parts can be relatively rotated in a direction bringing the eccentric surfaces of the two parts into close contact. The construction illustrated is such that rotation of about 90° is permitted when the curved eccentric surfaces are in tight contact and in a position illustrated in Figs. 14 and 15. It will be apparent that such rotation, due to the longitudinal tapering of these surfaces, serves to draw the two members longitudinally together wherein their faces 45 and 46 are in tight contact at 52.

In Figs. 16–18, I have illustrated a pipe joint comprising a collar or outer pipe section 80 cooperating with two inner pipe sections 82. The end portions of the collar are symmetrical from the center line thereof and each such portion comprises within the collar a plurality of relatively spaced cam-like lands 83 facing inwardly in a direction transversely of the section and an annular surface 84 inwardly of the lands. The cooperating end of each section 82 has an annular portion 85 complemental to the annular surface 84 and a plurality of relatively spaced cam-like lands 86 rearwardly thereof and facing outwardly in a direction transversely of the section, these ends of the inner sections 82 being complemental to the ends of the sections 80 and constructed to permit insertion of the ends 85—86 into the ends 83—84 when the two sections are in a predetermined relative rotary position wherein the lands 86 are in alignment with the recesses or gaps 88 between the lands 83 and the lands 83 are in alignment with the recesses between the lands 86, the recesses being wide enough to receive the lands.

The surfaces 84 and 85 are preferably slightly tapered or conical, as illustrated, and the lands 86 and cooperating surfaces 83 are not only tapered to the conical configuration illustrated but are also made slightly eccentric or the like, including spiral and like surfaces which would perform the required function. The construction is such that when the sections 82 are inserted into the sections 80 and then given a relative rotation in clockwise direction the cooperating surfaces 83 and 86 function to bring such surfaces into firm contact with each other transversely of the sections and move the sections 82 longitudinally inward to engage the surfaces 85 and 84 into a tight sealing annular contact. When the sections are in the joined relation illustrated in Fig. 16, they have an annular contact at 84—85, a triple surface contact therearound at 83—86, and furthermore an annular contact at 90. It will be noted that the inwardly and outwardly facing lands 83 and 86 cause most of the thrust load to be directed transversely of the sections and thereby bind the two sections securely and tightly together into substantially a single unit, the relatively smaller resultant thrust longitudinally causing the two sections to be held in sealing contact at 84—85. The contact at 90 is produced by engagement of the outer end of the section 80 with the cylindrical body portion of the section 82, the section 82 preferably being provided with a slight clearance at 91. It will be apparent that such joint forms a fluid tight seal at 84—85 and provides a substantial and rigid coupling between and along the two sections at 84—85, at 83—86 and at 90.

It will be noted that in Figs. 1–15 I have illustrated my novel joint as embodying two pairs of bearing surfaces disposed diametrically opposite to each other and in Figs. 16–18 I have illustrated three pairs of bearing surfaces disposed equal distances about the joint. While I desire it to be understood that the joint may employ any suitable number of such bearing surfaces, it is believed that three or more is preferable for the reasons that such construction more equally distributes the thrust load of the bearing surfaces around the joint and requires less relative rotation to couple and uncouple the joint, it being apparent that 90° rotation is required when two pairs of bearing surfaces are employed and that only 60° rotation is required when three pairs of bearing surfaces are employed.

In Fig. 19 is illustrated a jar 92 provided with a cover 94 having a portion 95 projecting into a complemental socket 96 formed in the jar, the portions 95 and 96 corresponding to any of the bearing portions above described and illustrated in Figs. 1–18. Rotation of the cover is adapted to bind the cover into secure contact with the jar.

In Fig. 20 I have illustrated an electric lamp socket member 98 as formed with a socket 99 and the base 100 of an electric light bulb as formed with a complementary projection 102 for engaging within the socket after the manner herein illustrated and described. An annular stop shoulder may be provided at 103 whereby to limit the position of the base and make proper contact at 104.

In Fig. 21 is illustrated a hot water bottle 106 having a stopper 107, the bottle and stopper being provided respectively with complementary socket and projection after the manner herein illustrated and described whereby the stopper can be quickly and securely applied to and removed from the bottle. A suitable stop flange may be formed on the stopper at 103 and an operating handle is provided at 110.

Having thus described my invention what I claim as new and desire to secure by Letters Patent of the United States is:

1. In a coupling, a member having a socket therein open at one face of the member and having a continuous wall surrounding the socket and provided with relatively spaced lands having inner surfaces converging in a direction towards said face and curved transversely of the member, and a second member having a portion projecting outwardly therefrom and provided with relatively spaced lands having peripheral surfaces diverging in a direction toward the free end of said portion and curved transversely of the member, the socket and said outwardly projecting portion being complemental to each other and the radii of said lands being of such extent and the socket being of such greater extent on certain radii as to permit the insertion of said portion into the socket when the lands of one member are in registration with the spaces between the lands on the other member, the two members being relatively rotatable to another position wherein said converging and diverging surfaces are in opposing relation when said portion is so inserted, and the coupling having cooperating cam surfaces for drawing said converging and diverging surfaces into binding engagement.

2. The coupling defined in claim 1 plus a third member carrying certain of said cam surfaces and rotatable independently of the first and second named members, the three members being coaxial.

3. The coupling defined in claim 1 wherein said cam surfaces are directly on and integral with the said members.

4. The coupling defined in claim 1 wherein said cam surfaces are respectively on said face of the socket member and the opposing face of the other member.

5. The coupling defined in claim 1 wherein said curved surfaces on the members are eccentric and provide the said cam surfaces.

6. The coupling defined in claim 1 wherein said converging surfaces and said diverging surfaces each comprises a plurality of surfaces having the centers thereof located more than 90° apart.

7. The coupling defined in claim 1 wherein the combined two members have annular opposing end surfaces.

8. In a coupling, a member having a socket therein open at one face of the member and having a wall extending about the socket and provided with a plurality of relatively spaced lands having inwardly facing surfaces converging in a direction towards said face and eccentrically curved transversely of the member, and a second member having a portion projecting outwardly therefrom and provided with relatively spaced peripheral surfaces diverging in a direction toward the free end of said portion and eccentrically curved transversely of the member, the socket and said outwardly projecting portion being complemental to each other and constructed to permit insertion of said portion into the socket when the two members are in a predetermined relative rotary position, the two members being thereupon relatively rotatable to another position wherein the contour of said surfaces bring and bind the two members together.

9. In a coupling, a member having a socket therein open at one face of the member and having a wall extending about the socket and provided with relatively spaced inner surfaces converging in a direction towards said face and eccentrically curved transversely of the member, a second member having a portion projecting outwardly therefrom and provided with relatively spaced peripheral surfaces diverging in a direction toward the free end of said portion and eccentrically curved transversely of the member, the socket and said outwardly projecting portion being complemental to each other and constructed to permit insertion of said portion into the socket when the two members are in a predetermined relative rotary position, and cooperating stop surfaces on the two members, the two members being relatively rotatable to another position wherein the contour of said inner and peripheral surfaces bring and bind the two members together with said stop surfaces in opposed engagement.

10. In a pipe joint, inner and outer pipe sections, the outer section having an opening in one end thereof and having a wall extending about the opening and provided with a plurality of relatively spaced cam-like lands facing inwardly in a direction transversely of the section and an annular surface extending about the opening inwardly of the lands, the inner section having an annular portion at one end thereof complemental to said annular surface and a plurality of relatively spaced cam-like lands rearwardly thereof and facing outwardly in a direction transversely of the section, the said ends of the sections being complemental to each other and constructed to permit insertion of the said inner section end into the outer section end when the two sections are in a predetermined relative rotary position, the two sections being thereupon relatively rotatable to another position wherein the contour of said lands binds the two sections into tight contact transversely and draws them together longitudinally with the said annular portion of the inner section in tight sealing relation with said annular surface of the outer section.

11. The pipe joint defined in claim 10 in which the outer and inner sections have cooperating annular surfaces in supporting engagement at the said one end of the outer section and rearwardly of the lands on the inner section, when the two sections are in said sealing engagement with each other.

12. In a pipe joint, inner and outer pipe sections, the outer section having an opening in one end thereof and having a wall extending about the opening and provided with a plurality of relatively spaced cam-like lands facing inwardly in a direction transversely of the section and an annular surface extending about the opening inwardly of the lands and tapering outwardly toward said one end, the inner section having an annular portion at one end thereof tapering inwardly toward said one end of the inner section and complemental to said annular surface of the outer section and a plurality of relatively spaced cam-like lands rearwardly thereof and facing outwardly in a direction transversely of the section, the said ends of the sections being complemental to each other and constructed to permit insertion of the said inner section end into the outer section end when the two sections are in a predetermined relative rotary position, the two sections being thereupon relatively rotatable to another position wherein the contour of said lands binds the two sections into tight contact transversely and draws them together longitudinally with the said annular portion of the inner section in tight sealing contact with said annular surface of the outer section, and the two sections having cooperating annular surfaces in supporting engagement, at the said one end of the outer section and rearwardly of the lands on the inner section, when the two sections are in said sealing engagement with each other.

13. In a pipe joint, inner and outer pipe sections, the outer section having an opening in one end thereof and having a wall extending about the opening and provided with a plurality of relatively spaced lands having surfaces facing inwardly in a direction transversely of the section and converging in a direction towards said end and eccentrically curved transversely thereof and having an annular surface extending about the opening inwardly of the lands, the inner section having an annular portion at one end thereof complemental to said annular surface and a plurality of relatively spaced lands rearwardly thereof and having surfaces and facing outwardly in a direction transversely of the section and diverging in a direction toward said one end and eccentrically curved transversely of the section, the said ends of the sections being complemental to each other and constructed to permit insertion of said inner section end into the outer section end when the two sections are in a predetermined relative rotary position, the two sections being thereupon relatively rotatable to another position wherein the contour of said surfaces binds the two sections into tight contact transversely and draws them together longitudinally with said annular portion of the inner section in tight sealing contact with said annular surface of the outer section.

14. In a coupling, a member having a socket therein open at one face of the member and having a substantially continuous wall surrounding the socket and provided with relatively spaced inner surfaces converging in a direction towards said face and curved transversely thereof, and a second member having a portion projecting outwardly therefrom and provided with relatively spaced peripheral surfaces diverging in a direction toward the free end of said portion and curved transversely thereof, the socket and said outwardly projecting portion being complemental to each other and said portion being of such less extent on certain radii and the socket being of such greater extent on certain radii as to permit the insertion of said portion into the socket when said certain radii of the members are in registration, the two members being relatively rotatable to another position wherein said converging and diverging surfaces are in opposing relation when said portion is so inserted, and the coupling having cooperating surfaces including a cam surface on one of said members for drawing said converging and diverging surfaces into binding engagement.

15. In a joint, inner and outer sections, the outer section having an opening in one end thereof and having a wall extending about the opening and provided with a plurality of relatively spaced lands extending about the opening and having inwardly facing cam-like surfaces, the inner section having a plurality of relatively spaced lands adjacent to one end thereof and having outwardly facing cam-like surfaces, the said ends of the sections being complemental to each other and constructed to permit insertion of the said inner section end into the outer section end when the two sections are in a predetermined relative rotary position, the two sections being thereupon relatively rotatable to another position wherein the contour of said surfaces brings and binds the two sections together.

EDWARD L. SHAW.